United States Patent [19]
Shipman

[11] Patent Number: 5,819,232
[45] Date of Patent: Oct. 6, 1998

[54] METHOD AND APPARATUS FOR INVENTORY CONTROL OF A MANUFACTURING OR DISTRIBUTION PROCESS

[75] Inventor: Lester Lynn Shipman, Wilmington, Del.

[73] Assignee: E. I. du Pont de Nemours and Company, Wilmington, Del.

[21] Appl. No.: 620,523

[22] Filed: Mar. 22, 1996

[51] Int. Cl.⁶ .................................................. G06F 153/00
[52] U.S. Cl. ................................................ 705/8; 705/22
[58] Field of Search ..................... 705/7, 8, 22; 395/904; 364/468.02, 468.06, 468.05, 468.1, 468.07, 468.08, 468.09, 468.13, 478.04

[56] References Cited

U.S. PATENT DOCUMENTS

| | | |
|---|---|---|
| 4,459,663 | 7/1984 | Dye . |
| 4,888,692 | 12/1989 | Gupta et al. ................................. 705/8 |
| 5,040,123 | 8/1991 | Barber et al. . |
| 5,229,948 | 7/1993 | Wei et al. .......................... 364/468.06 |
| 5,459,656 | 10/1995 | Fields et al. ................................. 705/7 |
| 5,495,430 | 2/1996 | Matsunari et al. ................. 364/468.06 |
| 5,541,848 | 7/1996 | McCormack et al. ....................... 705/7 |
| 5,615,109 | 3/1997 | Eder ............................................ 705/8 |

OTHER PUBLICATIONS

Neena Sathi et al., "Resource Configuration and Allocation", IEEE Expert Magazine, 04/92, vol. 7, Iss. 2, pp. 26–35. Apr. 1992.

Edward A. Silver and Rein Peterson, Decision Systems for Inventory Management and Production Planning, *John Wiley & Sons*, 61–67; 88–96; 102–127; 130–133; 252–253; 296–298.

Primary Examiner—Donald E. McElheny, Jr.

[57] ABSTRACT

A method and apparatus, using a computer model, to control a manufacturing or distribution process, which determines a demand forecast by using an optimized historical weighting factor, determines an upper and a lower bound of a planned inventory by explicitly accounting for the customer order lead time, and computes a production schedule at predetermined intervals to maintain an actual inventory between the upper and lower bounds of the planned inventory.

20 Claims, 8 Drawing Sheets

FIG.2

DATA TABLE

1. Stock-keeping units
2. Date order placed
3. Date order shipped
4. Last date order was changed
5. Amount shipped
6. Maximum customer order lead time
7. Minimum customer order lead time
8. Service level over many inventory cycles
9. Seasonality, if any
10. Average peak running rate
11. Variance in peak running rate
12. Average utility
13. Variance in utility
14. Average yield
15. Variance in yield
16. Inventory holding cost factor
17. Variable cost per unit
18. Variable changeover cost
19. Average transition time
20. Variance in transition time
21. Monitoring interval

METHOD AND APPARATUS FOR INVENTORY CONTROL OF A MANUFACTURING OR DISTRIBUTION PROCESS

FIELD OF THE INVENTION

This invention relates to a method of forecasting, inventory planning, and scheduling operations in manufacturing or distributing facilities and more particularly to a method based on customer order lead time.

BACKGROUND OF THE INVENTION

Business Resource Planning (BRP) has been used in manufacturing businesses in order to increase the speed of new products to market, to provide sufficient product to customers by carrying sufficient inventory, and to reduce production costs. BRP processes which directly impact inventory are demand forecasting, inventory planning, master production planning, material requirements planning, and distribution requirements planning.

Prior art has been concerned with various aspects of the BRP process. For example, U.S. Pat. No. 5,040,123 discloses an expert system scheduler based on heuristics derived from factory experience and concepts of forward and backward scheduling. The main deficiency of this expert system is that conventional methods are employed to set inventory and safety stock. No means of forecasting is used to predict future inventory levels and thus modify the expert system scheduler.

Another U.S. Pat. No. 4,459,663 discloses a data processing machine to automatically schedule production of products and components. The method of this patent uses actual and planned customer orders, but there is no teaching regarding how to determine the number and size of the planned customer orders. Highly inaccurate forecasts for future demand may therefore be generated. This patent's failure to take into consideration the customer order lead time associated with the future demand will lead to either too much or too little inventory, thus resulting in either high inventory carrying costs or potential loss of sales.

The traditional ways of calculating safety stock are well-described in *Decision Systems for Inventory Management and Production Planning* by Edward A. Silver and Rein Peterson (John Wiley and Sons, New York 1985). In accordance with this text, statistically-calculated safety stock includes the average lead time (called period of risk), variance in the lead time, averaged demand rate, and variance in the demand rate. Only the lead time on the supply or production side is considered in the safety stock calculation. No lead time from the demand or customer side is considered for the safety stock calculation.

Demand forecasting is concerned with the ability to project future demand by customers for product produced in a manufacturing facility. Demand forecasting can be done by knowledgeable people, usually sales representatives, making a projection of future demand based on experience, customer information, and general economic conditions. Alternatively, demand can be forecast by analyzing historical shipment data using statistical techniques available in the open literature or by using commercial forecasting software packages designed for use on various computers. Both methods of demand forecasting tend to have a high forecast error which reduces the effectiveness of Business Resource Planning. Demand forecasting is often time-consuming and the demand forecast is typically updated infrequently, perhaps once per month. Business Resource Planners typically compensate for the high forecast error rate and the obsolescence of the demand forecast by carrying more inventory.

Inventory planning is concerned with the ability to determine the maximum and minimum inventory to be carried to meet customer orders in a timely fashion. Carrying too much inventory increases costs through the inventory carrying charge. Carrying too little inventory causes orders to be missed or placed in backlog, both decreasing the service level to the customer. Traditionally, inventory planning is done with statistical techniques. Since the time available between when a customer places an order and when the customer expects to receive the product is never considered, the traditional techniques tend to advise carrying higher than necessary inventory levels.

Master production scheduling is concerned with the ability to schedule production while maintaining inventory levels between the maximum and minimum levels determined by inventory planning. Based on current inventory and the demand forecast, master production scheduling projects the level of inventory into the future. Whenever inventory is projected to decrease to the minimum level, the manufacturing facility is advised to produce more product. Whenever inventory is projected to exceed the maximum level, the manufacturing facility is advised to produce less product or even no product. Since master production scheduling depends on the accuracy of the demand forecast and on the quality of the inventory planning, a manufacturing facility may make too much or too little of a product, leading to either excess inventory carrying costs or to poor customer service.

Material Requirements Planning (MRP) is concerned with the ability to assemble and make available all the materials, parts, and supplies needed for a production run. Material Requirements Planning uses the projected inventory from the master production schedule to communicate the need for various materials throughout the manufacturing process and to inform suppliers of quantities and delivery dates. Inaccurate and out-dated projected inventory causes the manufacturing facility to order too much or too little material, leading to frequent order changes to suppliers.

Distribution Requirements Planning (DRP) is concerned with the ability to maintain adequate inventory at distribution points outside the manufacturing facility. Such distribution points might be warehouses, terminals, or consignment stock at a distributor or customer. Distribution Requirements Planning systems calculate and set restock trigger points so that product can be shipped in time from the manufacturing facility to the distribution points. Distribution Requirements Planning depends on the accuracy of the demand forecast. Traditional ways to generate Distribution Requirements Planning use only the lead time needed to manufacture and transport product from the manufacturing facility to the distribution point. No consideration is given to the customer order lead time available when a customer requests product from the distribution facility. In the method of the present invention, customer order lead time is explicitly included at all points where the customer may place orders, whether directly with the manufacturing facility or with a distribution point. Use of the customer order lead time optimizes safety stock levels and the restock trigger points at the distribution facility.

In the method of the present invention, the customer order lead time is explicitly included in calculations for the inventory planning, the Master Production Scheduling, the Material Requirements Planning and the Distribution Requirements Planning. The explicit inclusion of customer order lead time in these calculations leads directly to lower safety stocks and to better business utilization of working capital, thus solving one or more of the above mentioned problems of the prior art.

SUMMARY OF THE INVENTION

In accordance with the present invention a computer implemented method of inventory control of a manufacturing or distribution process, using a computer model of the manufacturing or distribution process, which comprises the steps of:

a. determining a demand forecast by using an optimized historical weighting factor, b. determining an upper and a lower bound of a planned inventory by explicitly accounting for the customer order lead time, and c. computing a production schedule at predetermined intervals to maintain an actual inventory between the upper and lower bounds of the planned inventory.

The method the present invention comprises three components: demand forecasting, inventory planning, and master production scheduling or distribution requirements planning. More specifically, the present invention generates a detailed demand forecast, a detailed inventory plan, and a detailed master production schedule or distribution requirements plan. The present method employs statistical techniques that specifically incorporate customer order lead time, which is the difference in time intervals between the order placement and the shipping event, into generation of the demand forecast, the inventory plan, and the master production schedule. Use of the present method results in more accurate demand forecasting, better inventory planning, and improved master production scheduling or distribution requirements planning. Although this method was developed for application in the chemical industry, the present method is applicable to any manufacturing industry or distributing industry.

The present method utilizes various statistical methodologies as well as commercially available computing systems. One of the features of the present method is the linking together of the components of demand forecast, inventory plan, and master production schedule or distribution requirements plan so that the improvement in each component is cascaded into the next. Among the many benefits of using the present method are: more accurate demand forecasts, very frequent, typically daily, updates of demand forecasts, reduced inventories, and better customer service with fewer missed or late shipments.

Another feature of the method is the generation of the demand forecast by using a normalized, weighted average of historical shipping data from a predetermined period to calculate the most likely demand per time interval in the future. A common prior art method to calculate the demand per day in the future is to simply average the amount of product or items shipped each week for the past several weeks and dividing the result by the number of days in the time period used to calculate the average demand per day. The prior art method of simple averaging cannot detect trends that demand is increasing or decreasing on a day to day or week to week basis. In the present invention, the amount of product shipped in the most recent time interval, typically a day, is given the most weight, the amount shipped two time intervals, i.e. two days, ago is given less weight, the amount shipped three time intervals, i.e. three days, ago is given even less weight, and so on, until the entire pre-determined period of historical shipping data has been taken into account.

Another feature of the present method is the determination of an optimum weighting factor used to calculate the demand per time interval. This is accomplished by finding the weighting factor that gives the lowest mean average deviation, i.e., the absolute value of the difference between the amount forecasted to be shipped and the amount actually shipped for the pre-determined period, the difference being divided by the total amount shipped over the predetermined period. This is done computationally on a computer, typically starting with the weighting factor set equal to a near zero value, such as 0.01, and increasing the weighting factor by small increments, such as 0.01, until the weighting factor is equal to 1.0, and then selecting the weighting factor that resulted in the lowest mean average deviation. Computer capability is selected so that the demand forecast as expressed in demand per time interval can be recalculated every time interval for thousands of items or stock-keeping units produced in a manufacturing facility or ordered for a distributing facility by resetting the time period counter. The demand forecast calculation can typically be executed on a computer in a few seconds or a few minutes, depending on the number of items or stock-keeping units being forecast and the CPU speed of the computer. The forecast error generated using the method of the present invention is typically at least 20% lower and most often 50% lower than the forecast error generated in commercially available prior art demand forecast software packages.

Another feature of the present method is the use of a measure of time known as the period of risk. The period of risk starts at the moment that it is decided to schedule a new manufacturing run for a product and ends at the moment that an amount of product equal to the average order size has been produced and passed quality release. For example, a manufacturing facility sets a schedule every Monday and the product can be made in 3 days. The period of risk is 7+3=10 days since the decision to make product is frozen every 7 days and the amount of product must last until the production run after next, even though the actual manufacturing time is less than 10 days. The period of risk is used to modify the pre-determined historical period used to calculate the demand forecast. Thus additional time is added in period of risk increments, the forecasts are produced in period of risk increments, and the actual shipments are collected in period of risk increments.

Another feature of the present method is that the period of risk can vary over time. Whenever the period of risk varies over time, a probability distribution function is used to express the average period of risk and the variance in the period of risk. It is preferred to determine the actual probability distribution function for the period of risk from historical data. However, such probability distribution functions may be approximated by a Gaussian distribution or a Poisson distribution or other suitable probability distribution function, as determined by one familiar with statistical techniques.

Another feature of the present method is the use of customer order lead time, known by the acronym COLT. Customer order lead time is the difference in time intervals between the date the order was placed and the date the order was shipped. Whenever the customer order lead time varies over time, a probability distribution function is used to express the average customer order lead time and the variance in the customer order lead time. It is preferred to determine the actual probability distribution function for the customer order lead time from historical data. However, such probability distribution functions may be approximated by a Gaussian distribution or a Poisson distribution or other suitable probability distribution function, as determined by one familiar with statistical techniques.

Another feature of the present invention is the determination of an inventory plan which minimizes the combination of: (a) the changeover or transition costs to go from one product or item to the next in the manufacturing cycle, plus (b) the cost of holding inventory. In most manufacturing situations, the lowest manufacturing cost is typically obtained by making very long runs of a particular product or item to avoid the difficulties and costs of changeover or transitions. However, long product runs result in high inventory. On the other hand, if very low inventory targets are arbitrarily set, then the particular products or items must be made very frequently resulting in many changeovers or transitions which increase manufacturing costs. The present invention facilitates determining an optimum (lowest total cost) balance between the length of manufacturing runs and the amount of inventory.

Another feature of the present invention is the modification of the typical equations used to calculate an inventory plan. Such inventory plans consist of a lower bound for inventory level and an upper bound for inventory level, comprised of the amount of cycle stock plus the amount of safety stock. The improvement in the present invention is the modification of the time factor (over which demand uncertainty is measured) to be the difference of the period of risk and the customer order lead time. The use of this modified time factor typically reduces the average amount of safety stock to be carried by twenty to fifty percent (20 to 50%) compared to conventional inventory planning methods and mathematical models. As with the demand forecast, the inventory plan is re-calculated every day, which typically occurs within a few seconds or minutes with a computer. Another feature of the present method is the explicit use of customer order lead time in the calculation of the master production schedule. The purpose of the master production schedule is to keep the inventory level between the minimum and the maximum value determined by the inventory plan. This will assure the desired product or item will be available and at the same time will minimize the total of the combined total cost of changeovers or transitions and the cost of holding inventory. Therefore production runs are terminated when inventory approaches the maximum value of inventory and production runs are initiated when inventory approaches the minimum value of inventory. Customer order lead time improves the performance of the master production schedule by improving the accuracy of the projected inventory. Each time interval the current inventory level is read from the inventory transaction system. In addition, all the open orders are read from the order entry transaction system. The future time interval by time interval level of inventory based on current inventory, open orders, current fixed production schedule, demand forecast and customer order lead time is projected many time intervals into the future.

Another advantage of the master production schedule of the present invention is that the future product demand consists of a weighted combination of actual open orders and an amount of product demand from the forecast. The total amount of demand is the sum of: one hundred percent (100%) of the actual open orders plus a percentage of the amount of product projected from the forecast. The percentage of the amount of production based on the amount of product projected from the forecast product demand can vary smoothly from 0% to 100%. In other words, the master production schedule can be all make-to-order, or can be all make-to-stock, or can be any combination of make-to-order plus make-to-stock. Prior art techniques and commercially available master production schedule packages handle only make-to-order or only make-to-stock manufacturing situations since there is no consideration given to customer order lead time.

Another feature of the master production schedule is the ability to produce an inventory projection for a predetermined period of time intervals into the future. The inventory projection of the present invention consists of the combination of: the current inventory, plus the amount of material on the production schedule, minus actual open orders, minus amount of product forecasted to be sold over and above the amount of the open orders. Conventional methods cannot accurately forecast the amount to be sold over and above the amount of the open orders; instead they use an over-simplified approach in which orders consume the forecast. The method of the present invention uses the more accurately forecasted demand per time interval and the statistical expectation value of the difference between predetermined period of time intervals into the future and the customer order lead time to more accurately forecast the amount to be sold over and above the amount of the open orders.

BRIEF DESCRIPTION OF THE DRAWINGS

FIG. 2 is a detailed list of the data needed for steps A–F of FIG. 1.

DETAILS OF THE INVENTION

Figure 1:
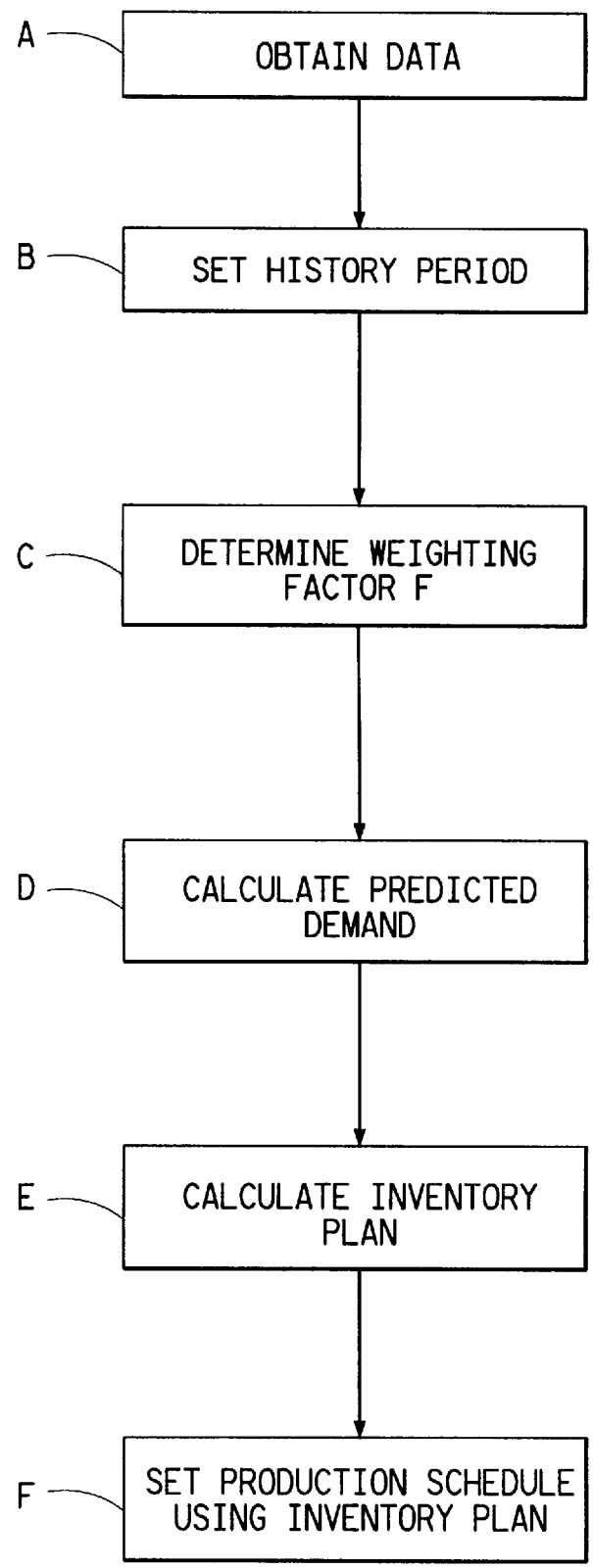
FIG. 1 is a block diagram showing the overall steps of the method.

The overall steps of the method are shown in FIG. 1. A detailed list of the data needed for steps A–F is shown in FIG. 2.

Figure 3A:
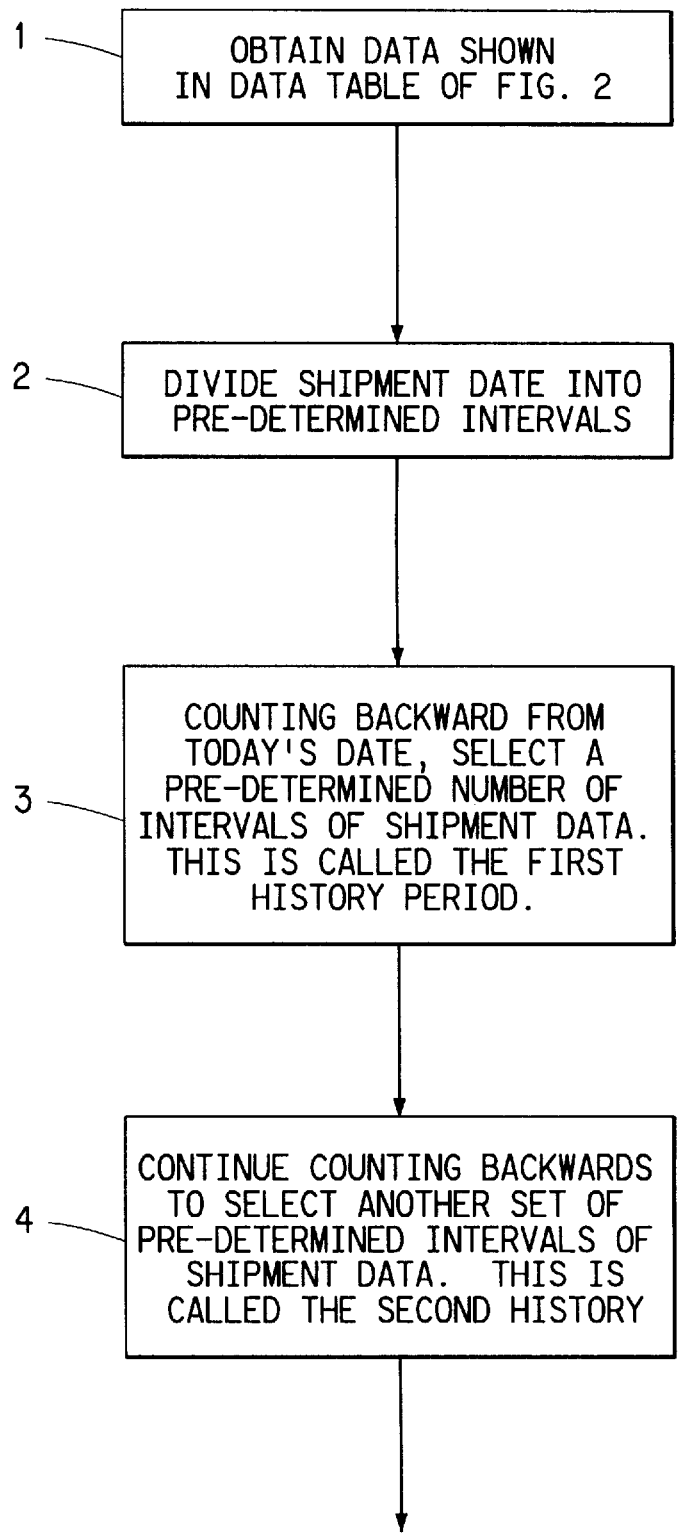
FIGS. 3A–3E is a detailed block diagram of the method.

Step B of setting the history periods is shown in greater detail in FIG. 3A. As indicated in step 2, historical shipment data is divided into predetermined intervals. A predetermined number of intervals of shipment data is selected by counting backward from today's date. This selected time period is called the first history period, as shown in step 3. The second predetermined number of intervals is selected by continuing to count backwards. This second selected time period is called the second history period, as shown in step 4.

Figure 3B:
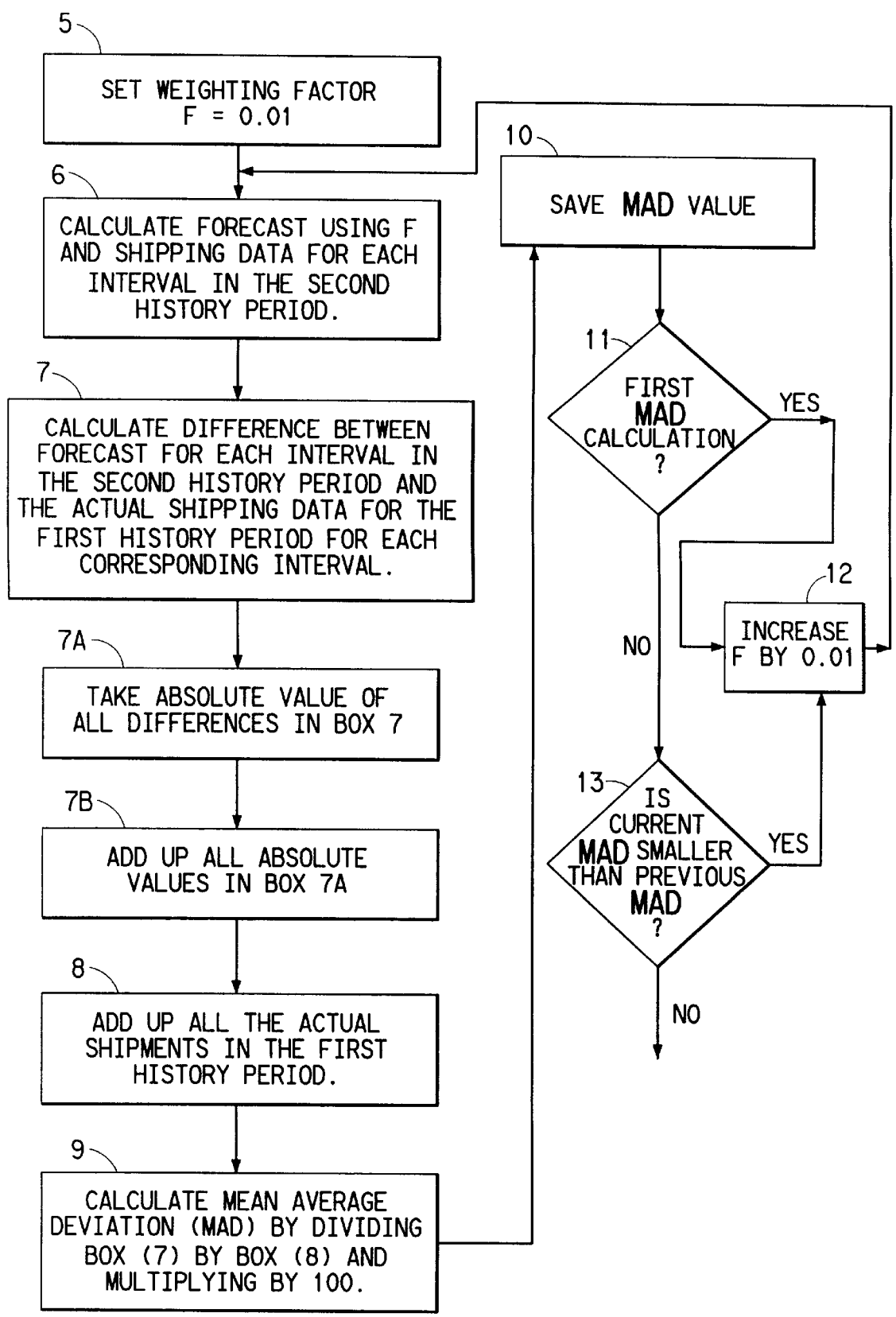

Step C of determining the historical weighting factor F is shown in greater detail in FIG. 3B. The optimum value of F is determined by a recursive method shown in steps 5–13. As indicated in step 5, initially the weighting factor F is set to a very small number, for example, F=0.01. Using this value of F and the shipping data in the second history period, a forecast for each interval in the first history period is calculated. The difference between the forecast for each interval of the first history period and the actual shipping data for each interval of the first history period is calculated. The percent mean averaged deviation (MAD) is determined by adding the absolute values of these differences then dividing the sum of these differences the sum of the actual shipments for the first history period and multiplying by 100. The value of MAD is compared to the previous value of MAD. If the current value of MAD is smaller than the previous value, F is increased by a small amount. For example, F may be increased by 0.01. Steps 6–13 are repeated until the lowest value of MAD is determined. The value of F that gives the lowest value of MAD is selected as the optimized, historical weighting factor shown in step 14 of FIG. 3C.

Figure 3C:
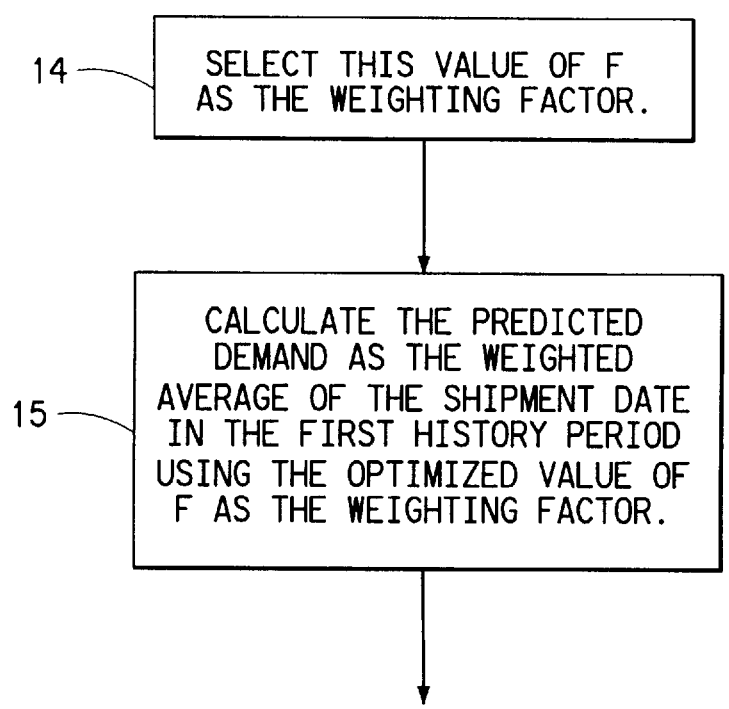

Step D of calculating predicted demand is further defined in FIG. 3C. As shown in step 15, predicted demand is calculated as the weighted average of the shipment data in the first history period using the selected value of F as the historical weighting factor.

Each demand forecast ($FC_j$) for WPOR_ave time periods is calculated as follows:
FCj=WPOR_ave*DPDj, where WPOR_ave is the average period of risk over a predetermined demand forecast period of W time intervals.

$$DPDj = \frac{\sum_{i=1}^{P} F^{1-i} * S_{j-i}}{\sum_{i=1}^{P} F^{1-i}} \quad \text{Equation 1}$$

where F is a weighting factor, determined in steps 5–13, as previously discussed, P is the number of time intervals of the second history period, and $DPD_j$ is the weighted average demand per time interval.

$S_{j-i}$ are the actual shipments for the j-i th time interval. The optimal weighting factor, F, is calculated by finding the value for F that minimizes the mean absolute deviation (MAD) for Q sequential forecasts, each of which is shifted by one time interval from the forecasts on either side. MAD is calculated as follows:

$$MAD = 100 * \frac{\sum_{j=1}^{Q} \left| FC_j - \sum_{i=1}^{W} S_{i+j} \right|}{\sum_{j=1}^{Q} \sum_{i=1}^{W} S_{i+j}}$$

The MAD sum is over Q sequential forecasts, where Q represents the number of time periods of the first history period.

Figure 3D:
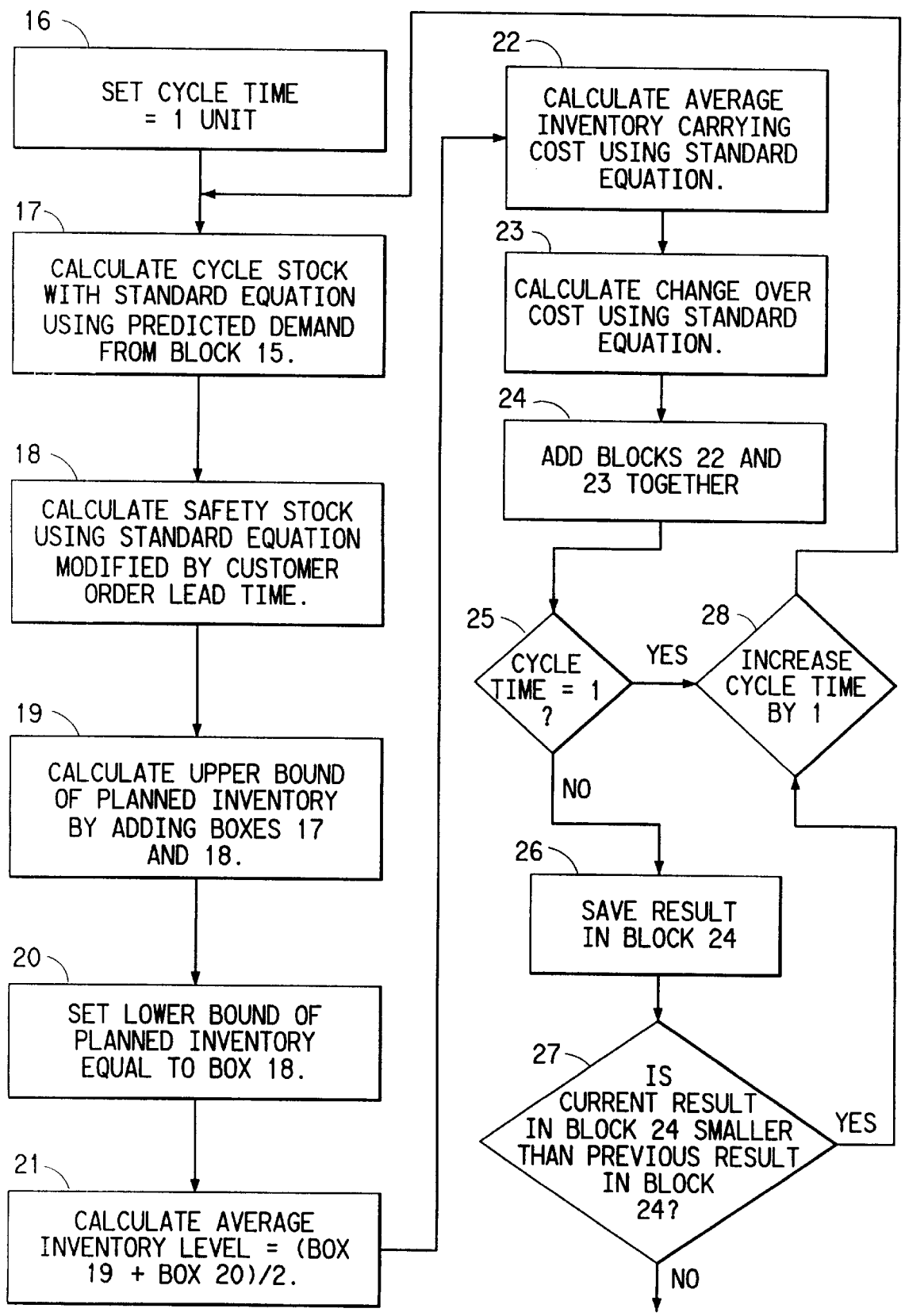

Step E of calculating the inventory plan is further detailed in FIG. 3D. The initial step of calculating the inventory plan is step 16 where the cycle time is set to one unit. The upper bound and the lower bound of the inventory plan are determined in a recursive method shown in steps 17–30. The cycle stock is calculated using the predicted demand of step 15. The safety stock is calculated using a standard equation except that the period of risk is replaced by the expectation value of the difference between the period of risk and the customer order lead time. The upper bound of the inventory plan is the sum of the cycle stock and the safety stock so calculated. The lower bound of the inventory plan is set equal to the safety stock so calculated. The inventory is set to vary between the upper bound and the lower bound. The average inventory is then the sum of the upper bound and the lower bound divided by 2. Using the average inventory, the average inventory carrying cost is calculated. Total changeover cost is calculated as the sum of the individual changeover costs. The average inventory carrying cost and the average changeover cost are added together. This sum of inventory carrying cost and changeover cost is compared to the previous sum of inventory carrying cost and changeover cost. If the current value of this sum is smaller than the previous value, then the cycle time is increased by one unit. Steps 17–28 are repeated until the lowest value of this sum is determined. As shown in step 29, the upper bound for the inventory plan is set to the upper bound corresponding to the lowest sum of costs. As shown in step 30, the lower bound for the inventory plan is set to the lower bound which gives the lowest sum.

Expressed more simply, each time a production run is started a changeover cost is incurred. The average time between production runs is Cycle Time (CT). CT is determined by minimizing the following:

TOTAL_COST=annual cost of transitions+annual cost of holding inventory

The annual cost of holding inventory is related to the average inventory level, which is:

average_inventory_level=safety_stock+cycle_stock/2

The cycle stock (CS) is:

$$CS = \left| \frac{1}{\text{Production-rate-}DPD} - \frac{1}{DPD} \right|$$

The safety stock is:

$$SS = \$PROBNORM\_Inv(SL1) * \sqrt{|<POR - COLT>*VPD + (DPD^2)*<(POR - COLT - <POR - COLT>)^2>|}$$

where:
SL1 is the fraction of kgs that are shipped on time divided by ( period of risk–COLT). $PROBNORM_INV is a standard function for a normal distribution that inputs the service level (SL1) and outputs the number of standard deviations. Higher service levels mean more standard deviations. <POR–COLT> is the expectation value of POR–COLT given that POR>COLT. POR and COLT both have probability distributions, which are approximated follows:
The probability distribution for COLT is a Gaussian centered at COLT_ave with a variance of COLT_var.
The probability distribution for POR is a Gaussian centered at POR_ave with a variance of POR_var.

In general, if there is enough historical data to calculate the actual probability distribution, then the actual probability distribution is used instead of the Gaussian approximation. Usually there is not enough data. VPD is the variance per day from the forecast. DPD is the demand per day from the forecast.

$$<(POR - COLT - <POR - COLT>)^2>$$

is the expectation value of $(POR-COLT-<POR-COLT>)^2$ given that POR>COLT. This quantity is a variance. SL1 is related to SL2, the fraction of kgs shipped on time integrated over all time as follows:

SL1=1−(1−SL2)*(CT/<POR−COLT>), where POR>COLT.

Figure 3E:
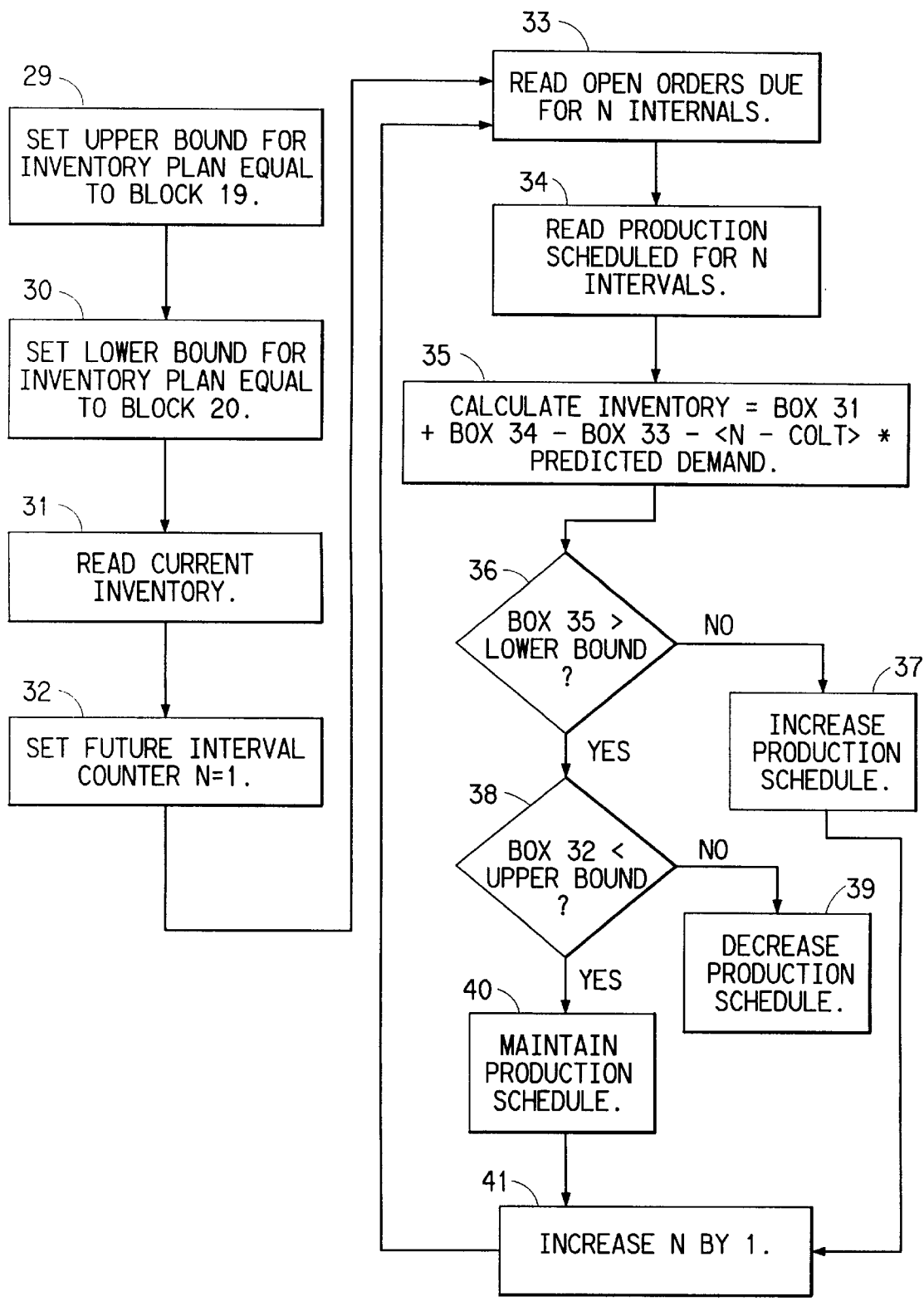

Step F of setting the production schedule is further detailed in FIG. 3E.

As shown in step 31, the current inventory is read from an inventory tracking system. The future interval counter N is set to 1 as shown in step 32. As shown in step 33, open orders due for N future intervals are read from an order entry transaction system. As shown in step 34, the amount of production already scheduled in read from the current schedule. In step 35, the inventory at N intervals is calculated as the sum of current inventory and production already scheduled minus the sum of open orders minus the predicted demand modified by a factor equal to the expectation value of the difference between N and customer order lead time. Thus, the predicted inventory for a predetermined number of future intervals is computed from the sum of current inventory plus all production scheduled to be produced within the predetermined number of intervals, minus the sum of all open orders scheduled to be shipped within the predetermined number of intervals, minus a predicted or forecast demand, which has been scaled by being multiplied by the expectation value of the difference between the number of intervals and the customer order lead time.

The calculated inventory is compared to the lower bound as shown in step 36. If the calculated inventory is less than the lower bound the production schedule is increased as shown in step 37. Then the future interval counter is increased by 1 and steps 33–41 are repeated. If the calculated inventory is larger than the lower bound, then the inventory is compared to the upper bound as shown in step 38. If the calculated inventory is less than the upper bound, then the current production schedule is maintained as shown in step 40. If the calculated inventory is greater than the upper bound, then the production schedule is decreased as shown in step 39. Then the future interval counter is increased by 1 and steps 33–41 are repeated.

The purpose of the master production schedule is to keep the inventory oscillating between peak and trough; this will assure the desired product availability level and will minimize the total annualized cost of doing changeovers+holding inventory. Therefore production runs are terminated when approaching peak and production runs are initiated when getting near trough. COLT improves the performance of the master production schedule by improving the accuracy of the projected inventory. Each day the current inventory level, INV(0), is read from the inventory transaction system. In addition all of the open orders are read from the order entry transaction system. The demand forecast is regenerated daily using the algorithm describe above. Peak and trough are re-calculated daily using the algorithm described above. With COLT, the inventory level N time intervals into the future is calculated as follows:

$$INV(N) = \text{Current Inventory} - \langle N-COLT \rangle * DPD$$

−(sum of open orders scheduled to ship on or before time interval N)

+(sum of production scheduled to be produced on or before time interval N)

Where <N−COLT> is the expectation value of N−COLT where N>COLT. When INV(N) is projected to dip below TROUGH, then the decision to start a new production run should be made in N-POR time intervals or earlier. When INV(N) is projected to rise above PEAK then the production run should be terminated at the point that the inventory just reaches peak.

Figure 4:
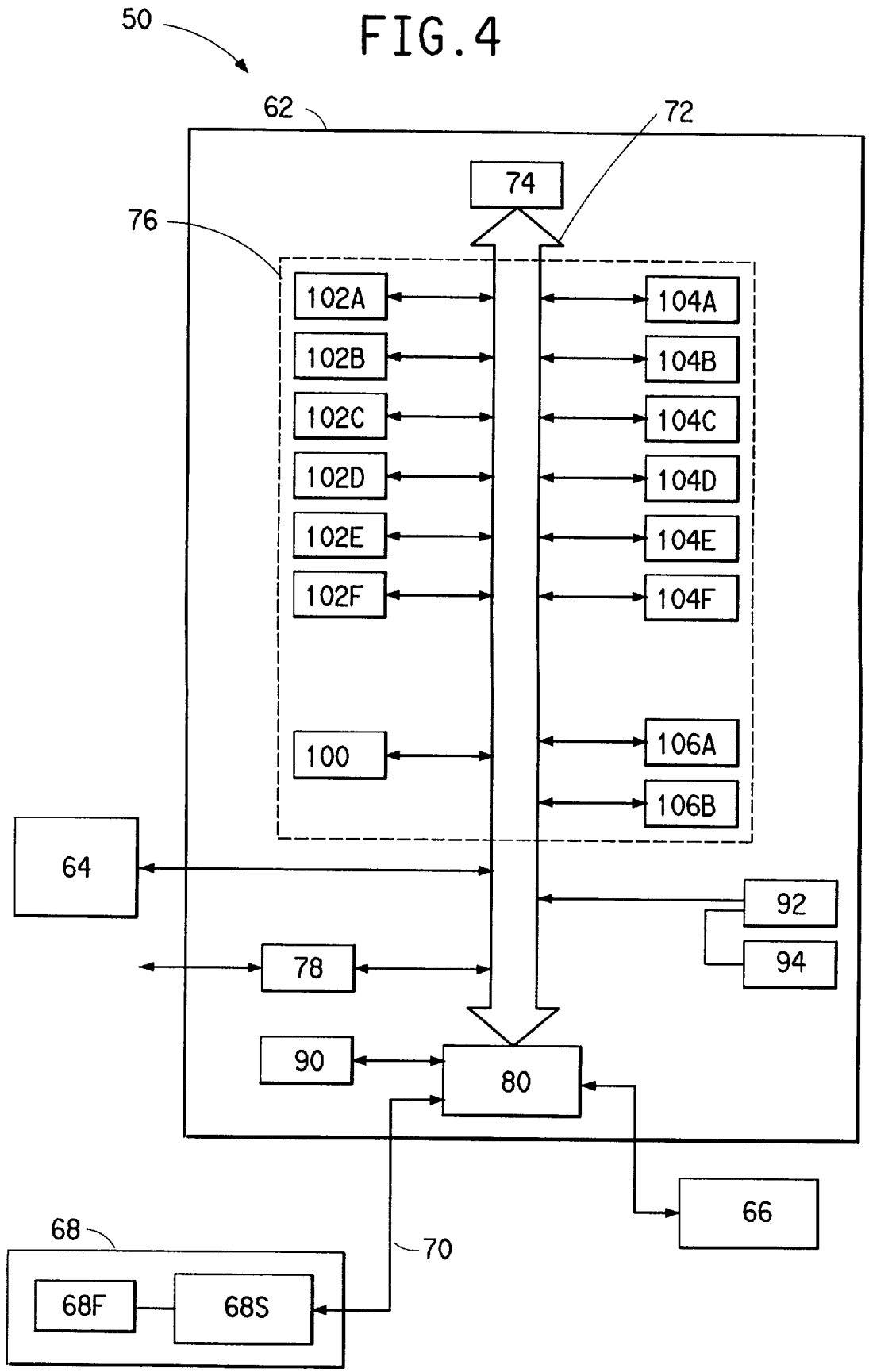
FIG. 4 is a block diagram of a computer apparatus for practicing the method.

FIG. 4 illustrates an apparatus 60 in accordance with the present invention configured as a computer workstation. The workstation 60 comprises a computer system 62 operatively connected to one or more output display devices 64, 66. The computer system 62 may be implemented, for example, using a Power Macintosh™ Model 7100/66 computer from Apple Computer of Cupertino, Calif. or other suitable computer workstation. The output devices may be optionally implemented using a color CRT display device and/or a color printer device. Suitable for use as the color display 64 is the seventeen-inch SyncMaster 17GLs color display available from Samsung Electronics America, Inc. The printer 66 may be implemented using a Laserwriter II laser printer.

The computer system 62 has a bidirectional databus 72 connecting a central processing unit 74 with a memory 76. The memory 76 may be implemented using any suitable form of read-write, or random access memory (RAM), devices. A random access memory having a capacity of thirty two (32) megabytes is sufficient.

The system 62 also includes a network interface card, such as an Ethernet interface card 78. Integral interface circuitry 80 connects the databus 72 to the printer 66, and to a disk storage subsystem 90. A Winchester disk storage subsystem having a 500 megabyte capacity is sufficient. The network interface card 78 interfaces the databus 72 to other computers, not shown. Input commands to the central processing unit are effected by a keyboard 92 and a mouse pointing device 94.

A scanner unit 68 for reading in a digital representation of order and shipping documents is associated with the computer system 62. The scanner unit 68 may be implemented using a Model ScanJet 3C/ADf available from Hewlett-Packard Co. The scanner unit 68 comprises a page feeder unit 68F and a scanning unit 68S. The scanner unit 68 interfaces to the computer system 62 via a SCSI communication link 70. The scanning unit 68S scans the order and shipping documents to detect reflected light fluxes and converts the light fluxes into ASCII characters using character recognition software such as OmniPage Professional 5.0, from Caere Corp. The order and shipping documents may alternatively be extracted from online databases via the network interface 78.

The memory 76 is partitioned into a program segment 100 and a plurality of data storage segments indicated by reference numerals having numerical prefixes 102, 104 or 106. The data storage segments are used for storing various input parameters, such as current inventory, open orders, associated customer order lead time, invoiced shipments, as well as calculated intermediate parameters, such as demand forecast, upper and lower bounds of the planned inventory, cycle stock, safety stock and calculated output parameters, such as production schedule, produced in accordance with the present invention.

The segments of the memory 76 having the reference numeral prefix 102 store various input parameters. These input parameter segments include: a segment 102A for storing the current inventory; a segment 102B for storing open orders and associated customer order lead time; a segment 102C for storing invoiced shipments.

The segments of the memory 76 indicated by the reference numeral prefix 104 store various calculated intermediate parameters produced in accordance with the present invention. These intermediate parameter memory segments include: a segment 104A for storing demand forecast; a segment 104B for storing an upper bound of the planned inventory; a segment 104C for storing a lower bound of the planned inventory; a segment 104D for storing cycle stock quantities; and a segment 104E for storing safety stock quantities; and a segment 104F for storing the weighting factor F.

The segments of the memory 76 indicated by the reference numeral prefix 106 store various calculated output parameters produced in accordance with the present invention. These output parameter memory segments include: a segment 106A for storing a production schedule; and a segment 106B for storing intermediate and output parameter values to be printed on printer 66.

The central processing unit 74, under control of the program stored in memory segment 100 and in conjunction with one or more of the memory segments 102, 104, 106, defines means for generating various calculated intermediate parameters (stored in the memory segments with the prefix 104) and various calculated output parameters (stored in the memory segments with the prefix 106), as has been developed in connection with the above discussion of the operation of the present invention. The one or more of the memory segments 102, 104, 106, defines a data structure useful for controlling inventory in a manufacturing and distribution process. The apparatus 60 thus comprises a data processing system, containing a data structure, executing an application program, for controlling inventory in a manufacturing and distribution process, the data structure being formed by the method described above in conjunction with FIGS. 1, 2, and 3A–F.

The following examples illustrate aspects of the method of the present invention.

EXAMPLE 1

Typical Polymer Product Wheel

Customer Order Lead Time (COLT) also plays a role in the optimization of production planning. When a number of products are produced on the same manufacturing equipment, products are alternated in a predetermined sequence or 'wheel'. In such an arrangement, variability in demand, production, utility, and yield affect all products because a change in the production time for any one product changes the production time for all subsequent products. Conversely, use of COLT for one or more products not only enables a reduction in the required safety stock for that product, but can reduce the overall uncertainty and the resultant total inventory for all products in the wheel.

A typical polymer resin product wheel runs with 8 products of varying demand (Table 1) and production parameters (Table 2). The production parameters are defined in Table 3. The manufacturing plant cannot produce the total quantity necessary to meet US demand, so the difference between the forecast and production capability must be imported from Europe at a cost and time penalty. Without use of COLT, 2242M lbs. of product 8 must be imported from Europe each year.

Two of the products (4, 5) are further processed downstream and the true demand of these products is therefore known precisely anywhere from 30 to 60 days in advance. Use of a 30 day COLT for these two products alone will reduce the total variable cost of production from $1113 M per year to $796 M per year (Table 4). Alternatively, this inventory reduction and resultant wheel time reduction can be used to produce an additional 1460M lbs. of product 8 at almost no extra cost ($1137 M—see Table 5).

Most other products produced in this equipment are sold directly to end use customers. These customers typically give the producer 5 to 25 days of customer order lead time (Table 6). Use of this COLT for each of these products would further reduce the cost down to $604 M or enable a total of 1643M lbs. of product 8 to be produced at an even lower cost ($1016 M).

TABLE 1

| Products | US Demand/ Day (lbs.) | US Demand/ Year (M Lbs.) | Current US Annual Dem. From US (M Lbs) | Current US Annual Dem. From Europe (M Lbs.) |
|---|---|---|---|---|
| 1 | 310.8 | 113 | 113 | 0 |
| 2 | 7203.9 | 2629 | 2264 | 365 |
| 3 | 951.0 | 347 | 347 | 0 |
| 4 | 26365.6 | 9623 | 9623 | 0 |
| 5 | 4969.0 | 1814 | 1814 | 0 |
| 6 | 3113.7 | 1137 | 1137 | 0 |
| 7 | 12899.1 | 4708 | 4108 | 600 |
| 8 | 6143.3 | 2242 | 0 | 2242 |

TABLE 2

| Product | 1 | 2 | 3 | 4 | 5 |
|---|---|---|---|---|---|
| DPD | 310.80 | 6203.90 | 951.00 | 26365.00 | 4969.00 |
| VPD | 600000.00 | 1e+08 | 40000000.00 | 1.3e+09 | 5.7e+08 |
| R | 55080.00 | 65280.00 | 65280.00 | 67320.00 | 67320.00 |
| VR | 17000000.00 | 24000000.00 | 24000000.00 | 25500000.00 | 25500000.00 |
| U | 0.97 | 0.97 | 0.97 | 0.97 | 0.97 |
| YU | 2.5e–03 | 2.5e–03 | 2.5e–03 | 2.5e–03 | 2.5e–03 |
| Y | 0.95 | 0.95 | 0.95 | 0.95 | 0.95 |
| VY | 2.5e–03 | 2.5e–03 | 2.Se–03 | 2.5e–03 | 2.5e–03 |
| INV_HOLD_FA | 0.28 | 0.28 | 0.28 | 0.28 | 0.28 |
| VC | 1.00 | 1.00 | 1.00 | 1.00 | 1.00 |
| VCC | 9000.00 | 4500.00 | 5250.00 | 6000.00 | 6000.00 |
| SL2 | 0.95 | 0.95 | 0.95 | 0.95 | 0.95 |
| TT | 0.33 | 0.33 | 0.33 | 0.3 | 0.33 |
| VT | 7e–04 | 0.00 | 5e–04 | 5e–04 | 5e–04 |
| MON_INT | 1.00 | 1.00 | 1.00 | 1.00 | 1.00 |

| Product | 6 | 7 | 8 | Cleanout |
|---|---|---|---|---|
| DPD | 3113.70 | 11232.60 | varies | — |
| VPD | 20000000.00 | 2e+08 | 0.00 | — |
| R | 81600.00 | 67320.00 | 61200.00 | — |
| VR | 37500000.00 | 25500000.00 | 21100000.00 | — |
| U | 0.97 | 0.97 | 0.97 | — |
| VU | 2.5e–03 | 2.5e–03 | 2.5e–03 | — |
| Y | 0.95 | 0.95 | 0.95 | — |
| VY | 2.5e–03 | 2.5e–03 | 2.5e–03 | — |

TABLE 2-continued

| | | | | |
|---|---|---|---|---|
| INV_HOLD_FA | 0.28 | 0.28 | 0.28 | — |
| VC | 1.00 | 1.00 | 1.00 | — |
| VCC | 6750.00 | 6750.00 | 6000.00 | 9500.00 |
| SL2 | 0.95 | 0.95 | 0.95 | — |
| T | 0.38 | 0.38 | 0.38 | 0.33 |
| VTT | 1e−04 | 1e−04 | 1e−04 | 0.00 |
| MON_INT | 1.00 | 1.00 | 1.00 | 1.00 |

TABLE 3

| Row | Definition | Units (X = lbs, sheets, drums, etc.) |
|---|---|---|
| DPD | demand per day | X/day |
| VPD | demand variance per day | X**2/day |
| R | average peak rate | X2/day2 |
| VR | variance in peak rate | unitless |
| U | average utility | unitless |
| VU | variance in utility | unitless |
| Y | average yield | unitless |
| VY | variance in the yield | unitless |
| INV_HOLD_FACTOR | inventory holding cost factor | fraction/yr. |
| VC | variable cost per X | $/X |
| VCC | variable changeover cost | $/changeover |
| SL2 | service level over many cycles | fraction |
| TT | average transition time | days |
| VTT | variance in transition time | days**2 |
| MON_INT | monitoring interval | days |

TABLE 4

Effect of COLT for only product 4 and 5 on Wheel

| COLT (days) | 0 | 30 | 60 |
|---|---|---|---|
| Wheel Cost ($M/yr.) | 1113 | 796 | 764 |
| Wheel time (days) | 26.3 | 41.4 | 41.4 |
| Ave Inventory (days) | 41.9 | 30.1 | 27.9 |
| Inventory cost ($M/yr.) | 2225 | 1600 | 1485 |
| Discretionary time (days) | 2 | 4 | 4 |

TABLE 5

Effect of increased production of product 8 on cost with and without COLT

| Addt'l Qty (M lbs/yr.): | 0 | 730 | 1460 | 1643 | 2242 |
|---|---|---|---|---|---|
| 1. Without COLT ($M/yr.) | 1113 | 1285 | 1535 | | 3417 |
| 2. With 30 days COLT for products 4,5 ($M/yr.) | 833 | 949 | 1137 | | 2963 |
| 3. Same as 2 + 15 days COLT for all other products ($M/yr.) | 604 | 702 | 890 | 1016 | 2352 |

TABLE 6

| Products | Ave COLT (Days) |
|---|---|
| 1 | 10.0 |
| 2 | 11.1 |
| 3 | 7.5 |
| 4 | 30.0 |
| 5 | 30.0 |
| 6 | 11.4 |
| 7 | 24.0 |
| 8 | 0.0 |

EXAMPLE 2

The following example pertains to an actual textile fiber production situation.

Step 1. Obtain Data

COLT uses three types of transactional data:

historical invoiced shipments current inventory open orders

The transaction systems extract the data one time per day in the early morning and "push" them using FIP (file transfer protocol) to the computer on which COLT runs. The data is imported into COLT via menu items.

The calculation was performed on Dec. 29, 1995. The historical invoiced shipments for the 365 days preceding Dec. 29, 1995 were as follows:

| | QUANTITY (kgs) | ORDER DATE | SHIP DATE | COLT |
|---|---|---|---|---|
| 1 | 20205 | 21-DEC-94 | 09-JAN-95 | 19 |
| 2 | 20107 | 21-DEC-94 | 09-JAN-95 | 19 |
| 3 | 20174 | 21-DEC-94 | 09-JAN-95 | 19 |
| 4 | 19724 | 21-DEC-94 | 09-JAN-95 | 19 |
| 5 | 19773 | 21-DEC-94 | 09-JAN-95 | 19 |
| 6 | 20211 | 21-DEC-94 | 09-JAN-95 | 19 |
| 7 | 19735 | 2l-DEC-94 | 09-JAN-95 | 19 |
| 8 | 20263 | 21-DEC-94 | 09-JAN-95 | 19 |
| 9 | 19770 | 21-DEC-94 | 09-JAN-95 | 19 |
| 10 | 19610 | 21-DEC-94 | 09-JAN-95 | 19 |
| 11 | 1722 | 13-JAN-95 | 03-FEB-95 | 21 |
| 12 | 566 | 6-JAN-95 | 19-JAN-95 | 3 |
| 13 | 20201 | 30-JAN-95 | 03-FEB-95 | 4 |
| 14 | 20197 | 30-JAN-95 | 03-FEB-95 | 4 |
| 15 | 19776 | 30-JAN-95 | 03-FEB-95 | 4 |
| 16 | 19970 | 30-JAN-95 | 03-FEB-95 | 4 |
| 17 | 19749 | 30-JAN-95 | 06-FEB-95 | 7 |
| 18 | 20364 | 30-JAN-95 | 06-FEB-95 | 7 |
| 19 | 19811 | 30-JAN-95 | 06-FEB-95 | 7 |
| 20 | 19653 | 30-JAN-95 | 06-FEB-95 | 7 |
| 21 | 19766 | 13-FEB-95 | 03-MAR-95 | 18 |
| 22 | 19775 | 13-FEB-95 | 03-MAR-95 | 18 |
| 23 | 20260 | 13-FEB-95 | 03-MAR-95 | 18 |
| 24 | 20288 | 13-FEB-95 | 03-MAR-95 | 18 |
| 25 | 1153 | 12-APR-95 | 19-APR-95 | 7 |
| 26 | 3468 | 20-APR-95 | 28-APR-95 | 8 |
| 27 | 21014 | 24-APR-95 | 27-APR-95 | 3 |
| 28 | 5242 | 05-JUN-95 | 07-JUN-95 | 2 |
| 29 | 5223 | 16-JUN-95 | 20-JUN-95 | 4 |
| 30 | 5220 | 28-JUN-95 | 05-JUL-95 | 7 |
| 31 | 4065 | 02-MAY-95 | 02-JUN-95 | 31 |
| 32 | 5227 | 28-JUN-95 | 06-JUL-95 | 8 |
| 33 | 1743 | 15-MAY-95 | 16-MAY-95 | 1 |
| 34 | 2305 | 13-JUN-95 | 14-JUN-95 | 1 |
| 35 | 2299 | 16-JUN-95 | 20-JUN-95 | 4 |
| 36 | 6990 | 23-MAY-95 | 29-MAY-95 | 6 |
| 37 | 6974 | 13-JUN-95 | 19-JUN-95 | 6 |
| 38 | 2323 | 28-JUN-95 | 31-JUL-95 | 33 |
| 39 | 2320 | 28-JUN-95 | 11-SEP-95 | 75 |
| 40 | 6987 | 05-JUL-95 | 17-JUL-95 | 12 |
| 41 | 20351 | 20-JUL-95 | 07-AUG-95 | 18 |
| 42 | 20282 | 20-JUL-95 | 07-AUG-95 | 18 |
| 43 | 4039 | 26-JUL-95 | 31-JUL-95 | 5 |

-continued

| | QUANTITY (kgs) | ORDER DATE | SHIP DATE | COLT |
|---|---|---|---|---|
| 44 | 1159 | 08-AUG-95 | 14-AUG-95 | 6 |
| 45 | 2924 | 23-AUG-95 | 29-AUG-95 | 6 |
| 46 | 1158 | 22-AUG-95 | 31-AUG-95 | 9 |
| 47 | 1752 | 29-AUG-95 | 01-SEP-95 | 3 |
| 48 | 4088 | 29-AUG-95 | 08-SEP-95 | 10 |
| 49 | 2313 | 20-SEP-95 | 25-SEP-95 | 5 |
| 50 | 2337 | 20-SEP-95 | 02-OCT-95 | 12 |
| 51 | 1769 | 20-SEP-95 | 16-OCT-95 | 26 |
| 52 | 1158 | 02-NOV-95 | 06-NOV-95 | 4 |
| 53 | 1154 | 06-NOV-95 | 09-NOV-95 | 3 |
| 54 | 20353 | 17-NOV-95 | 24-NOV-95 | 7 |
| 55 | 19790 | 17-NOV-95 | 24-NOV-95 | 7 |
| 56 | 19746 | 17-NOV-95 | 27-NOV-95 | 10 |
| 57 | 20304 | 17-NOV-95 | 27-NOV-95 | 10 |
| 58 | 20133 | 17-NOV-95 | 27-NOV-95 | 10 |
| 59 | 19724 | 17-NOV-95 | 27-NOV-95 | 10 |
| 60 | 20276 | 17-NOV-95 | 11-DEC-95 | 24 |
| 61 | 20299 | 17-NOV-95 | 11-DEC-95 | 24 |
| 62 | 19795 | 17-NOV-95 | 11-DEC-95 | 24 |
| 63 | 19778 | 17-NOV-95 | 11-DEC-95 | 24 |
| 64 | 19878 | 17-NOV-95 | 12-DEC-95 | 25 |
| 65 | 20363 | 11-DEC-95 | 20-DEC-95 | 9 |
| 66 | 20303 | 11-DEC-95 | 20-DEC-95 | 9 |
| 67 | 20360 | 11-DEC-95 | 20-DEC-95 | 9 |
| 68 | 15176 | 11-DEC-95 | 22-DEC-95 | 11 |
| 69 | 15073 | 11-DEC-95 | 22-DEC-95 | 11 |

Customer order lead time (COLT) is the difference (days) between the SHIP DATE and the ORDER DATE.

The kg-weighted average (COLT_ave) and variance (COLT_var) for Customer Order Lead Times above are 13.6 days and 58.69 days$^2$, respectively.

The period of risk (POR) starts from the moment that it is decided to schedule a new manufacturing run for the product and ends at the moment that an amount of product equal to an average order size has been produced and passed quality release.

For the product in this analysis the average period or risk (POR_ave) and variance in the period of risk (POR_var) are 13 days and 1 days$^2$, respectively.

Step 2. Demand Forecast

For the demand forecast we collect the demand for the last 25+WPOR sevenday intervals where WPOR_ave is POR_ave rounded up to the nearest integral sevenday period. The analysis was performed on December 29, so the last sevenday period ended on Dec. 28, 1995. The shipments for the past 25+2=27 sevenday periods were collected into sevenday buckets as follows:

| | ENDING DATE OF 7-DAY PERIOD | KGS SHIPPED |
|---|---|---|
| 1 | 29-JUN-95 | 0 |
| 2 | 06-JUL-95 | 10447 |
| 3 | 13-JUL-95 | 0 |
| 4 | 20-JUL-95 | 6987 |
| 5 | 27-JUL-95 | 0 |
| 6 | 03-AUG-95 | 6362 |
| 7 | 10-AUG-95 | 40633 |
| 8 | 17-AUG-95 | 1159 |
| 9 | 24-AUG-95 | 0 |
| 10 | 1-AUG-95 | 4082 |
| 11 | 7-SEP-95 | 1752 |
| 12 | 4-SEP-95 | 6408 |
| 13 | 1-SEP-95 | 0 |
| 14 | 8-SEP-95 | 2313 |
| 1 | 5-OCT-95 | 2337 |
| 16 | 2-OCT-95 | 0 |
| 17 | 9-OCT-95 | 1769 |
| 18 | 6-OCT-95 | 0 |
| 19 | 2-NOV-95 | 0 |
| 20 | 9-NOV-95 | 2312 |
| 21 | 6-NOV-95 | 0 |
| 22 | 3-NOV-95 | 0 |
| 23 | 0-NOV-95 | 120050 |
| 24 | 7-DEC-95 | 0 |
| 25 | 4-DEC-95 | 100026 |
| 26 | 1-DEC-95 | 61026 |
| 27 | 8-DEC-95 | 30249 |

Each demand forecast (FC$_j$) for WPOR_ave days is calculated as follows:

$$FC_1 = WPOR_{avg} * DPD_1$$

EQUATION 1:
$$DPDj = \frac{\sum_{i=1}^{13} F^{1-i} * S_{j-i}}{\sum_{i=1}^{13} F^{1-i}}$$

where F is a weighting factor.

S$_{j-i}$ are the actual shipments for the j-i th week. The optimal weighting factor, F, is calculated by finding the value for F that minimizes the mean absolute deviation (MAD) for 13 sequential forecasts, each of which is shifted by one sevenday bucket from the forecasts on either side. MAD is calculated as follows:

$$MAD = 100 * \frac{\sum_{j=1}^{13} \left| FC_j - \sum_{i=1}^{2} S_{i+j} \right|}{\sum_{j=1}^{13} \sum_{i=1}^{2} S_{i+j}}$$

The MAD sum is over 13 sequential forecasts.

For the product in this calculation MAD varies with F as follows:

| WEIGHTING FACTOR | MAD | WEIGHTING FACTOR | MAD | |
|---|---|---|---|---|
| 0.01 | 109.819358 | 0.51 | 67.279257 | |
| 0.02 | 108.660993 | 0.52 | 66.688045 | |
| 0.03 | 107.518718 | 0.53 | 66.102718 | |
| 0.04 | 106.392308 | 0.54 | 65.523196 | |
| 0.05 | 105.281537 | 0.55 | 64.949406 | |
| 0.06 | 104.186176 | 0.56 | 64.381285 | |
| 0.07 | 103.105997 | 0.57 | 63.818773 | |
| 0.08 | 102.040770 | 0.58 | 63.261820 | |
| 0.09 | 100.990263 | 0.59 | 63.028847 | <-- minimum MAD |
| 0.10 | 99.954243 | 0.60 | 63.258060 | |
| 0.11 | 98.932477 | 0.61 | 63.491069 | |
| 0.12 | 97.924730 | 0.62 | 63.727629 | |
| 0.13 | 96.930767 | 0.63 | 63.967477 | |
| 0.14 | 95.950350 | 0.64 | 64.210328 | |
| 0.15 | 94.983240 | 0.65 | 64.460617 | |
| 0.16 | 94.029200 | 0.66 | 64.737088 | |
| 0.17 | 93.087988 | 0.67 | 65.017395 | |
| 0.18 | 92.159363 | 0.68 | 65.301285 | |
| 0.19 | 91.243082 | 0.69 | 65.588478 | |
| 0.20 | 90.338901 | 0.70 | 65.878671 | |
| 0.21 | 89.446576 | 0.71 | 66.171535 | |
| 0.22 | 88.565860 | 0.72 | 66.466711 | |
| 0.23 | 87.696508 | 0.73 | 67.018030 | |
| 0.24 | 86.838270 | 0.74 | 68.033594 | |
| 0.25 | 85.990899 | 0.75 | 69.072689 | |

-continued

| WEIGHTING FACTOR | MAD | WEIGHTING FACTOR | MAD |
|---|---|---|---|
| 0.26 | 85.154144 | 0.76 | 70.122024 |
| 0.27 | 84.327756 | 0.77 | 71.180414 |
| 0.28 | 83.511483 | 0.78 | 72.246576 |
| 0.29 | 82.705074 | 0.79 | 73.319128 |
| 0.30 | 81.908275 | 0.80 | 74.396598 |
| 0.31 | 81.120835 | 0.81 | 75.477431 |
| 0.32 | 80.342500 | 0.82 | 76.559997 |
| 0.33 | 79.573017 | 0.83 | 77.642604 |
| 0.34 | 78.812132 | 0.84 | 78.723509 |
| 0.35 | 78.059592 | 0.85 | 79.800929 |
| 0.36 | 77.315145 | 0.86 | 80.873060 |
| 0.37 | 76.578535 | 0.87 | 81.938089 |
| 0.38 | 75.849513 | 0.88 | 82.994211 |
| 0.39 | 75.128374 | 0.89 | 84.039641 |
| 0.40 | 74.429663 | 0.90 | 85.072636 |
| 0.41 | 73.738020 | 0.91 | 86.091505 |
| 0.42 | 73.053227 | 0.92 | 87.094625 |
| 0.43 | 72.375066 | 0.93 | 88.080456 |
| 0.44 | 71.703327 | 0.94 | 89.047551 |
| 0.45 | 71.037805 | 0.95 | 89.994568 |
| 0.46 | 70.378297 | 0.96 | 90.920280 |
| 0.47 | 69.724612 | 0.97 | 91.823582 |
| 0.48 | 69.089111 | 0.98 | 92.703495 |
| 0.49 | 68.479692 | 0.99 | 93.559172 |
| 0.50 | 67.876441 | 1.00 | 94.389900 |

The data table used to construct MAD and VPD (variance per day) for the minimum MAD (0.59) is as follows:

| | FORECAST | ACTUAL | ABS(FORECAST − ACTUAL) | FORECAST − ACTUAL |
|---|---|---|---|---|
| 1 | 5972.663335 | 4650 | 1322.663335 | 1322.663335 |
| 2 | 5422.524434 | 2337 | 3085.524434 | 3085.524434 |
| 3 | 5108.641189 | 1769 | 3339.641189 | 3339.641189 |
| 4 | 3014.098302 | 1769 | 1245.098302 | 1245.098302 |
| 5 | 3224.401750 | 0 | 3224.401750 | 3224.401750 |
| 6 | 1902.397033 | 2312 | 409.602967 | 409.602967 |
| 7 | 1116.932240 | 2312 | 1195.067760 | −1195.067760 |
| 8 | 2521.809573 | 0 | 2521.809573 | 2521.809573 |
| 9 | 1486.868961 | 120050 | 118563.131039 | −118563.131039 |
| 10 | 877.252687 | 120050 | 19172.747313 | −119172.747313 |
| 11 | 99058.506419 | 100026 | 967.493581 | −967.493581 |
| 12 | 58443.009124 | 161052 | 102608.990876 | −102608.990876 |
| 13 | 116583.364164 | 91275 | 25308.364164 | 25308.364164 |

MAD is calculated by taking the sum of the "ABS (FORECAST−ACTUAL)" column and dividing it by the sum of the ACTUAL column, then multiplying the ratio by 100. After the optimal F is found (0.59 in this case), then the demand per day (DPD) is generated by taking the weighted average of the last 13 seven-day periods (as in equation 1 above). The demand variance per day (VPD) is calculated by taking the variance of the last column, "(FORECAST−ACTUAL)", in the table above and then dividing it by 7. The results are DPD=6783.3 kg/day and VPD=1.929499 e+08 kgs²/day.

Step 3. Inventory Planner

The production rate is 10,000 kgs/day. Because the production rate (10,000) exceeds the demand rate (6783.3), the production must cycle on/off to prevent inventory from growing without bound. Each time a production run is started a changeover cost is incurred. The average time between production runs is Cycle Time (CT). CT is determined by minimizing the following:

TOTAL_COST=annual cost of transitions+annual cost of holding inventory

We use an inventory holding cost of 28% of the variable cost of inventory per year.

The variable cost of 1 kg is $3.

Each changeover costs $3000.

The annual changeover cost is (365/CT)*3000 dollars.

The annual cost of holding inventory is average_inventory_level*$3*0.28 average_inventory_level=safety_stock+cycle_stock/2

The cycle stock (CS) is $$CS = \left| \frac{1}{\text{Production-rate-}DPD} - \frac{1}{DPD} \right|$$

The safety stock is $$SS = \$PROBNORM\_Inv(SL1) * \sqrt{|<POR - COLT> * VPD + (DPD^2) * <(POR - COLT - <POR - COLT>)^2>|}$$

where:

SL1 is the fraction of kgs that are shipped on time divided by (period of risk−COLT).

$PROBNORM_INV is a standard function for a normal distribution that inputs the service level (SL1) and outputs the number of standard deviations. Higher service levels mean more standard deviations.

<(POR−COLT)> is the expectation value of POR−COLT given that POR>COLT. POR and COLT both have probability distributions. We approximate these as follows.

The probability distribution for COLT is a Gaussian centered at COLT_ave with a variance of COLT_var.

The probability distribution for POR is a Gaussian centered at POR_ave with a variance of POR_var.

In general, if there is enough historical data to calculate the actual probability distribution then the actual probability distribution is used instead of the Gaussian approximation. Usually there is not enough data.

VPD is the variance per day from the forecast.

DPD is the demand per day from the forecast.

$$<(POR - COLT - <POR - COLT>)^2>$$

is the expectation value of $(POR-COLT-<POR-COLT>)^2$ given that POR>COLT. This quantity is a variance.

SL1 is related to SL2, the fraction of kgs shipped on time integrated over all time as follows:

SL1=1−(1−SL2)*(CT/<POR−COLT>), where POR>COLT.

For our calculation here we use SL2=0.98.

We do not allow safety stock to go negative. Zero (0) kgs is the lowest allowed SS.

TOTAL_COST varies with CT as follows:

| CT (DAYS) | ANNUAL CHANGE-OVER COST ($) | ANNUAL INVENTORY HOLDING COST ($) | TOTAL COST ($) | PEAK (KGS) | TROUGH (KGS) |
|---|---|---|---|---|---|
| 1 | 1095000 | 60521 | 1155521 | 73140 | 70958 |
| 2 | 547500 | 55009 | 602509 | 67669 | 63306 |
| 3 | 365000 | 51872 | 416872 | 65025 | 58479 |
| 4 | 273750 | 49752 | 323502 | 63593 | 54865 |
| 5 | 219000 | 48210 | 267210 | 62848 | 51938 |
| 6 | 182500 | 47042 | 229542 | 62548 | 49456 |
| 7 | 156429 | 46137 | 202565 | 62562 | 47288 |
| 8 | 136875 | 45428 | 182303 | 62809 | 45353 |
| 9 | 121667 | 44872 | 166538 | 63238 | 43600 |
| 10 | 109500 | 44437 | 153937 | 63811 | 41991 |
| 11 | 99545 | 44101 | 143647 | 64502 | 40501 |
| 12 | 91250 | 43849 | 135099 | 65293 | 39109 |
| 13 | 84231 | 43667 | 127897 | 66167 | 37801 |
| 14 | 78214 | 43545 | 121759 | 67113 | 36565 |
| 15 | 73000 | 43475 | 116475 | 68121 | 35391 |
| 16 | 68438 | 43452 | 111889 | 69184 | 34272 |
| 17 | 64412 | 43469 | 107881 | 70295 | 33202 |
| 18 | 60833 | 43522 | 104355 | 71450 | 32174 |
| 19 | 57632 | 43607 | 101239 | 72642 | 31185 |
| 20 | 54750 | 43722 | 98472 | 73870 | 30230 |
| 21 | 52143 | 43863 | 96005 | 75128 | 29307 |
| 22 | 49773 | 44027 | 93800 | 76415 | 28412 |
| 23 | 47609 | 44214 | 91822 | 77728 | 27543 |
| 24 | 45625 | 44420 | 90045 | 79065 | 26697 |
| 25 | 43800 | 44645 | 88445 | 80424 | 25874 |
| 26 | 42115 | 44887 | 87002 | 81802 | 25071 |
| 27 | 40556 | 45144 | 85700 | 83200 | 24286 |
| 28 | 39107 | 45416 | 84523 | 84614 | 23519 |
| 29 | 37759 | 45701 | 83460 | 86045 | 22767 |
| 30 | 36500 | 45999 | 82499 | 87490 | 22030 |
| 31 | 35323 | 46308 | 81630 | 88949 | 21307 |
| 32 | 34219 | 46628 | 80846 | 90421 | 20597 |
| 33 | 33182 | 46958 | 80140 | 91905 | 19899 |
| 34 | 32206 | 47297 | 79503 | 93400 | 19212 |
| 35 | 31286 | 47645 | 78931 | 94905 | 18536 |
| 36 | 30417 | 48002 | 78419 | 96421 | 17869 |
| 37 | 29595 | 48366 | 77961 | 97946 | 17212 |
| 38 | 28816 | 48738 | 77553 | 99479 | 16563 |
| 39 | 28077 | 49116 | 77193 | 101020 | 15923 |
| 40 | 27375 | 49501 | 76876 | 102569 | 15290 |
| 41 | 26707 | 49891 | 76599 | 104125 | 14664 |
| 42 | 26071 | 50288 | 76359 | 105688 | 14044 |
| 43 | 25465 | 50689 | 76154 | 107257 | 13431 |
| 44 | 24886 | 51096 | 75982 | 108832 | 12824 |
| 45 | 24333 | 51507 | 75840 | 110412 | 12223 |
| 46 | 23804 | 51922 | 75726 | 111998 | 11626 |
| 47 | 23298 | 52341 | 75639 | 113588 | 11035 |
| 48 | 22813 | 52765 | 75577 | 115183 | 10447 |
| 49 | 22347 | 53191 | 75538 | 116782 | 9865 |
| 50 | 21900 | 53622 | 75522 | 118385 | 9286 |
| 51 | 21471 | 54055 | 75525 | 119991 | 8710 |
| 52 | 21058 | 54491 | 75548 | 121601 | 8138 |
| 53 | 20660 | 54929 | 75589 | 123214 | 7569 |
| 54 | 20278 | 55370 | 75648 | 124830 | 7003 |
| 55 | 19909 | 55813 | 75722 | 126449 | 6440 |
| 56 | 19554 | 56258 | 75812 | 128070 | 5879 |
| 57 | 19211 | 56705 | 75916 | 129693 | 5320 |
| 58 | 18879 | 57154 | 76033 | 131318 | 4763 |
| 59 | 18559 | 57604 | 76163 | 132945 | 4208 |
| 60 | 18250 | 58055 | 76305 | 134573 | 3654 |
| 61 | 17951 | 58508 | 76459 | 136203 | 3102 |
| 62 | 17661 | 58961 | 76623 | 137833 | 2550 |
| 63 | 17381 | 59415 | 76796 | 139465 | 2000 |
| 64 | 17109 | 59870 | 76980 | 141098 | 1451 |
| 65 | 16846 | 60325 | 77172 | 142730 | 901 |
| 66 | 16591 | 60781 | 77372 | 144364 | 353 |
| 67 | 16343 | 61401 | 77744 | 146193 | 0 |
| 68 | 16103 | 62317 | 78420 | 148375 | 0 |
| 69 | 15870 | 63234 | 79103 | 150557 | 0 |
| 70 | 15643 | 64150 | 79793 | 152739 | 0 |
| 71 | 15423 | 65067 | 80489 | 154921 | 0 |
| 72 | 15208 | 65983 | 81192 | 157103 | 0 |
| 73 | 15000 | 66900 | 81900 | 159285 | 0 |
| 74 | 14797 | 67816 | 82613 | 161467 | 0 |
| 75 | 14600 | 68732 | 83332 | 163649 | 0 |
| 76 | 14408 | 69649 | 84057 | 165831 | 0 |
| 77 | 14221 | 70565 | 84786 | 168013 | 0 |
| 78 | 14038 | 71482 | 85520 | 170195 | 0 |
| 79 | 13861 | 72398 | 86259 | 172377 | 0 |
| 80 | 13688 | 73315 | 87002 | 174559 | 0 |
| 81 | 13519 | 74231 | 87750 | 176741 | 0 |
| 82 | 13354 | 75148 | 88501 | 178923 | 0 |
| 83 | 13193 | 76064 | 89257 | 181105 | 0 |
| 84 | 13036 | 76980 | 90016 | 183287 | 0 |
| 85 | 12882 | 77897 | 90779 | 185469 | 0 |
| 86 | 12733 | 78813 | 91546 | 187651 | 0 |
| 87 | 12586 | 79730 | 92316 | 189833 | 0 |
| 88 | 12443 | 80646 | 93089 | 192015 | 0 |
| 89 | 12303 | 81563 | 93866 | 194197 | 0 |
| 90 | 12167 | 82479 | 94646 | 196379 | 0 |

Note that the CT with lowest total cost is CT=50 days. The peak inventory (SS+CS) is 118,385 kgs and the trough (SS) inventory is 9,286 kgs.
Therefore the average inventory level is $$(118385-9286)/2+9286=63,836 \text{ kgs}$$

The annual total cost is $75,522.
For comparison purposes, let's see what the average inventory level would be for traditional (non-COLT) safety stock calculations where COLT_ave=0 and COLT_var=0;

| CT (DAYS) | ANNUAL CHANGE-OVER COST ($) | ANNUAL INVENTORY HOLDING COST ($) | TOTAL COST ($) | PEAK (KGS) | TROUGH (KGS) |
|---|---|---|---|---|---|
| 1 | 1095000 | 126522 | 1221552 | 151748 | 149566 |
| 2 | 547500 | 118110 | 665610 | 142790 | 138426 |
| 3 | 365000 | 113251 | 478251 | 138095 | 131549 |
| 4 | 273750 | 109915 | 383665 | 135215 | 126487 |
| 5 | 219000 | 107435 | 326435 | 133354 | 122444 |
| 6 | 182500 | 105509 | 288009 | 132152 | 119061 |
| 7 | 156429 | 103972 | 260400 | 131413 | 116139 |
| 8 | 136875 | 102722 | 239597 | 131017 | 113561 |
| 9 | 121667 | 101696 | 223363 | 130886 | 111248 |
| 10 | 109500 | 100848 | 210348 | 130967 | 109147 |
| 11 | 99545 | 100145 | 199691 | 131222 | 107220 |
| 12 | 91250 | 99564 | 190814 | 131621 | 105437 |
| 13 | 84231 | 99086 | 183316 | 132142 | 103776 |
| 14 | 78214 | 98695 | 176910 | 132768 | 102221 |
| 15 | 73000 | 98382 | 171382 | 133486 | 100756 |
| 16 | 68438 | 98135 | 166573 | 134284 | 99372 |
| 17 | 64412 | 97948 | 162360 | 135152 | 98058 |
| 18 | 60833 | 97814 | 158648 | 136084 | 96808 |
| 19 | 57632 | 97728 | 155360 | 137072 | 95614 |
| 20 | 54750 | 97685 | 152435 | 138111 | 94471 |
| 21 | 52143 | 97680 | 149823 | 139197 | 93375 |
| 22 | 49773 | 97711 | 147484 | 140325 | 92321 |
| 23 | 47609 | 97775 | 145383 | 141491 | 91306 |
| 24 | 45625 | 97868 | 143493 | 142694 | 90326 |
| 25 | 43800 | 97989 | 141789 | 143929 | 89379 |
| 26 | 42115 | 98136 | 140251 | 145194 | 88462 |
| 27 | 40556 | 98306 | 138861 | 146488 | 87574 |
| 28 | 39107 | 98498 | 137605 | 147808 | 86712 |
| 29 | 37759 | 98711 | 136470 | 149152 | 85874 |

-continued

| | | | | | |
|---|---|---|---|---|---|
| 30 | 36500 | 98943 | 135443 | 150519 | 85060 |
| 31 | 35323 | 99193 | 134516 | 151908 | 84267 |
| 32 | 34219 | 99461 | 133679 | 153317 | 83494 |
| 33 | 33182 | 99744 | 132926 | 154746 | 82740 |
| 34 | 32206 | 100042 | 132248 | 156192 | 82004 |
| 35 | 31286 | 100355 | 131641 | 157655 | 81285 |
| 36 | 30417 | 100681 | 131098 | 159134 | 80583 |
| 37 | 29595 | 101020 | 130615 | 160629 | 79895 |
| 38 | 28816 | 101371 | 130187 | 162138 | 79222 |
| 39 | 28077 | 101734 | 129811 | 163660 | 78563 |
| 40 | 27375 | 102107 | 129482 | 165196 | 77917 |
| 41 | 26707 | 102492 | 129199 | 166744 | 77283 |
| 42 | 26071 | 102886 | 128957 | 168305 | 76661 |
| 43 | 25465 | 103290 | 128755 | 169876 | 76051 |
| 44 | 24886 | 103702 | 128589 | 171459 | 75452 |
| 45 | 24333 | 104124 | 128457 | 173052 | 74863 |
| 46 | 23804 | 104554 | 128359 | 174655 | 74284 |
| 47 | 23298 | 104992 | 128290 | 176267 | 73714 |
| 48 | 22813 | 105438 | 128251 | 177889 | 73154 |
| 49 | 22347 | 105891 | 128238 | 179520 | 72603 |
| 50 | 21900 | 106352 | 128252 | 181159 | 72060 |
| 51 | 21471 | 106819 | 128290 | 182806 | 71525 |
| 52 | 21058 | 107293 | 128351 | 184462 | 70998 |
| 53 | 20660 | 107774 | 128434 | 186124 | 70479 |
| 54 | 20278 | 108260 | 128538 | 187795 | 69967 |
| 55 | 19909 | 108753 | 128662 | 189472 | 69463 |
| 56 | 19554 | 109251 | 128804 | 191156 | 68965 |
| 57 | 19211 | 109754 | 128965 | 192847 | 68474 |
| 58 | 18879 | 110264 | 129143 | 194544 | 67989 |
| 59 | 18559 | 110778 | 129337 | 196247 | 67510 |
| 60 | 18250 | 111297 | 129547 | 197956 | 67037 |
| 61 | 17951 | 111821 | 129772 | 199671 | 66570 |
| 62 | 17661 | 112350 | 130012 | 201392 | 66109 |
| 63 | 17381 | 112884 | 130265 | 203118 | 65653 |
| 64 | 17109 | 113422 | 130531 | 204849 | 65202 |
| 65 | 16846 | 113964 | 130810 | 206586 | 64757 |
| 66 | 16591 | 114510 | 131101 | 208327 | 64316 |
| 67 | 16343 | 115061 | 131404 | 210074 | 63881 |
| 68 | 16103 | 115615 | 131718 | 211825 | 63450 |
| 69 | 15870 | 116174 | 132043 | 213580 | 63023 |
| 70 | 15643 | 116736 | 132378 | 215340 | 62601 |
| 71 | 15423 | 117301 | 132724 | 217105 | 62184 |
| 72 | 15208 | 117870 | 133079 | 218873 | 61770 |
| 73 | 15000 | 118443 | 133443 | 220646 | 61361 |
| 74 | 14797 | 119019 | 133816 | 222423 | 60956 |
| 75 | 14600 | 119598 | 134198 | 224203 | 60554 |
| 76 | 14408 | 120180 | 134588 | 225987 | 60157 |
| 77 | 14221 | 120766 | 134987 | 227775 | 59763 |
| 78 | 14038 | 121354 | 135393 | 229567 | 59372 |
| 79 | 13861 | 121946 | 135807 | 231362 | 58985 |
| 80 | 13688 | 122540 | 136228 | 233161 | 58602 |
| 81 | 13519 | 123137 | 136656 | 234963 | 58222 |
| 82 | 13354 | 123737 | 137091 | 236768 | 57845 |
| 83 | 13193 | 124340 | 137533 | 238576 | 57471 |
| 84 | 13036 | 124945 | 137981 | 240387 | 57101 |
| 85 | 12882 | 125553 | 138435 | 242202 | 56733 |
| 86 | 12733 | 126163 | 138896 | 244019 | 56369 |
| 87 | 12586 | 126776 | 139362 | 245840 | 56007 |
| 88 | 12443 | 127391 | 139834 | 247663 | 55648 |
| 89 | 12303 | 128008 | 140312 | 249489 | 55292 |
| 90 | 12167 | 128628 | 140795 | 251318 | 54939 |

| COMPARISON | with COLT | without COLT |
|---|---|---|
| average inventory | 63,866 kgs | 126,062 kgs |
| total cost | $75,522 | $128,238 |

The average inventory is 49% lower with COLT. We typically find that the inventory with COLT is 20 to 50% lower than the inventory when using conventional inventory planning methods and models.

Step 4. Master Production Schedule

The aim of the master production schedule is to keep the inventory oscillating between peak and trough; this will assure the desired product availability level and will minimize the total annualized cost of doing changeovers+holding inventory. Therefore production runs are terminated when approaching peak and production runs are initiated when getting near trough.

COLT improves the performance of the master production schedule by improving the accuracy of the projected inventory.

Each day the current inventory level, INV(0), is read from the inventory transaction system. In addition all of the open orders are read from the order entry transaction system. The demand forecast is regenerated daily using the algorithm describe above. Peak and trough are re-calculated daily using the algorithm described above.

With COLT, the inventory level N days into the future is calculated as follows:

$INV(N)$ = Current Inventory − $<N\text{-}COLT>*DPD$ −
(sum of open orders scheduled to ship on or before day $N$) +
(sum of production scheduled to be produced on or before day $N$)

Where $<N\text{-}COLT>$ is the expectation value of N−COLT where N>COLT.

When INV(N) is projected to dip below TROUGH, then the decision to start a new production run should be made in N−POR days or earlier.

When INV(N) is projected to rise above PEAK then the production run should be terminated at the point that the inventory just reaches peak.

For the particular case reported here, $<N\text{-}COLT>$ has the following value as N increases.

| N (days) | $<N\text{-}COLT>$ (days) | N (days) | $<N\text{-}COLT>$ (days) |
|---|---|---|---|
| 1 | 0.04 | 16 | 4.28 |
| 2 | 0.10 | 17 | 4.93 |
| 3 | 0.17 | 18 | 5.62 |
| 4 | 0.27 | 19 | 6.36 |
| 5 | 0.38 | 20 | 7.14 |
| 6 | 0.53 | 21 | 7.96 |
| 7 | 0.70 | 22 | 8.81 |
| 8 | 0.92 | 23 | 9.69 |
| 9 | 1.17 | 24 | 10.59 |
| 10 | 1.46 | 25 | 11.51 |
| 11 | 1.81 | 26 | 12.45 |
| 12 | 2.20 | 27 | 13.41 |
| 13 | 2.64 | 28 | 14.37 |
| 14 | 3.14 | 29 | 15.35 |
| 15 | 3.68 | 30 | 16.33 |

In effect, $<N\text{-}COLT>$, where N>COLT, tells us how many days of supply out of the next N days, must be forecasted. For the remainder of the demand projection we look to the open orders.

CLOSED-LOOP PRODUCTION CONTROL

Open Loop Control

In the polymer example, Example 1, described above, a human production scheduler runs the model calculation on the computer workstation 60 using the method of the present invention and then makes rate changes by manual entry into a process control computer, based upon the recommendation generated by the computer model. This is open-loop control of production and inventory.

Closed Loop Control

This open-loop control methodology above can be extended in a straightforward way to become a closed-loop control methodology in which the human decision maker is taken out of the loop. Exactly the same data and exactly the same computer model is required to implement closed-loop control. However, in closed-loop control the computer workstation runs the demand forecasting, inventory planning, master production scheduling programs automatically at preset scheduled times using a job scheduler on the computer workstation. The computer workstation automatically reads input data, typically using the network interface 78, from other computer transaction systems (inventory tracking, order entry, etc) as previously described. The computer workstation, based upon the master production schedule generated by the master production schedule program, makes the decision whether or not to increase or decrease the production rate. The computer workstation controls the production rate changes by transmitting control messages, typically using the network interface, to a process control computer to change the process variables (such as flow rates of ingredients, the temperature of the reactor, and the pressure in the reactor).

The one or more of the memory segments 102, 104, 106, of computer system 62 thus defines a data structure useful for controlling a manufacturing and distribution process. The apparatus 60 thus comprises a data processing system, containing a data structure, executing an application program, for controlling a manufacturing and distribution process, the data structure being formed by the method described above in conjunction with FIGS. 1, 2, and 3A–F.

I claim:

1. A computer implemented method of inventory control of a manufacturing or distribution process using a computer model of the manufacturing or distribution process, which comprises the steps of:
   (a) determining a demand forecast by using an optimized historical weighting factor,
   (b) determining an upper and a lower bound of a planned inventory by explicitly accounting for the customer order lead time, and
   (c) computing a production schedule at predetermined intervals to maintain an actual inventory between the upper and lower bounds of the planned inventory.

2. The method of claim 1 further comprising explicitly accounting for a cost of production changeover and an inventory carrying cost.

3. The method of claim 1, where in step (c), a demand forecast is computed by:
   (i) dividing the shipment data into predetermined intervals,
   (ii) using a first predetermined number of intervals as a first history period and a second predetermined number of intervals as a second history period,
   (iii) using the second history period to compute predicted demand for the intervals of the first history period,
   (iv) computing the error between the predicted demand and the actual demand for the intervals of the first history period to determine, and
   (v) determining an historical weighting factor F, said factor being between 0 and 1, by comparing the predicted demand with the actual demand for each interval of the first history period, the weighting factor being optimized by a recursive method of computation.

4. The method of claim 3 where the weighting factor F is determined such that the mean average deviation of the difference between the actual demand and the predicted demand is minimized.

5. The method of claim 3 where the upper bound of the planned inventory is computed as the sum of a cycle stock and a safety stock, where the cycle stock is computed using the predicted demand and the historical weighting factor F and the safety stock is computed using a method wherein a period of risk value is replaced by the difference of the period of risk and a customer order lead time.

6. The method of claim 3 where the lower bound of the planned inventory is equal to the safety stock, where the safety stock is computed using a method wherein the period of risk value is replaced by the difference of the period of risk and the customer order lead time.

7. The method of claims 5 and 6 where the customer order lead time is a single value.

8. The method of claims 5 and 6 where the customer order lead time is a Gaussian distribution function.

9. The method of claims 5 and 6 where the customer order lead time is a Poisson distribution function.

10. The method of claims 5 and 6 where the customer order lead time is a probability distribution function determined from historical data.

11. The method of claims 5 and 6 where the period of risk is a single value.

12. The method of claims 5 and 6 where the period of risk is a Gaussian distribution function.

13. The method of claims 5 and 6 where the period of risk is a Poisson distribution function.

14. The method of claims 5 and 6 where the period of risk is a probability distribution function determined from historical data.

15. The method of claims 5 and 6 where the upper and lower bounds of the planned inventory are selected so that sum of cost of production changeovers and inventory carrying cost is minimized.

16. A method of inventory control of a manufacturing or distribution process comprising:
   (a) computing a production schedule that reads current inventory from an inventory tracking system, reads the open orders from an order entry transaction system, reads invoiced shipments from the transaction system,
   (b) at pre-determined intervals regenerating a demand forecast, wherein
      (i) the demand forecast is computed by dividing the shipment data into predetermined intervals,
      (ii) designating a first predetermined number of intervals as a first history period and designating a second predetermined number of intervals as a second history period,
      (iii) using the second history period to compute predicted demand for the intervals of the first history period,
      (iv) using the second history period to compute the error between the predicted demand for the intervals of the first history period and the actual demand for the intervals of the first history period to determine a historical weighting factor F, said factor being between 0 and 1, and
      the weighting factor being determined by comparing the predicted demand with the actual demand for each interval of the first history period, the weighting factor being optimized by a recursive method of computation and determined such that the mean average deviation of the difference between the actual demand and the predicted demand is minimized, and
   (c) at predetermined intervals recalculating the upper bound of the planned inventory, where the upper bound is computed as the sum of cycle stock and safety stock, wherein
      (i) the cycle stock is computed using the predicted demand and the historical weighting factor F, and
      (ii) the safety stock is computed using a method wherein the period of risk value is replaced by the difference of the period of risk and the customer order lead time, where the period of risk may be a single value, a Gaussian distribution function, a Poisson distribution function, or a probability distribution function determined from historical data, where the customer order lead time may be a single value, a Gaussian distribution function, a Poisson distribution function, or a probability distribution function determined from historical data, (d) at predetermined intervals recalculating the lower bound of the planned inventory, where the lower bound is equal to the safety stock, wherein (i) the safety stock is computed using a method wherein the period of risk value is replaced by the difference of the period of risk and the customer order lead time, where the period of risk may be a single value, a Gaussian distribution function, a Poisson distribution function, or a probability distribution function determined from historical data, where the customer order lead time may be a single value, a Gaussian distribution function, a Poisson distribution function, or a probability distribution function determined from historical data.

17. The method of claim 16 where predicted inventory for a predetermined number of future intervals is computed from:

the sum of current inventory plus all production scheduled to be produced within the predetermined number of intervals, minus the sum of all open orders scheduled to be shipped within the predetermined number of intervals, minus the scaled forecast demand, the scaled forecast demand being multiplied by the expectation value of the difference between the number of intervals and the customer order lead time.

18. A data structure generated by a method of any of claims 1–17.

19. A machine having a memory which contains a data structure for the control of a manufacturing and distribution process by performing the method of any of claims 1, 3, 5, 6, or 16.

20. A data processing system executing an application program for controlling a manufacturing and distribution process, containing a data structure, the data structure being formed by the method of any of claims 1, 3, or 16.

\* \* \* \* \*